United States Patent Office 3,533,857
Patented Oct. 13, 1970

3,533,857

METHOD OF RESTORING CRYSTALS DAMAGED BY IRRADIATION

James W. Mayer, Pasadena, and Ogden J. Marsh, Woodland Hills, Calif., assignors to Hughes Aircraft Company, Culver City, Calif., a corporation of Delaware No Drawing. Filed Nov. 29, 1967, Ser. No. 686,731
Int. Cl. H01l 7/54
U.S. Cl. 148—1.5 6 Claims

ABSTRACT OF THE DISCLOSURE

Crystals damaged by particle irradiation are restored by annealing at lower temperatures than heretofore by irradiation simultaneous with the annealing process.

The present invention relates to a method of restoring crystals damaged by irradiation. The invention has particular relation to the restoring and reorienting of crystal structure after damage and disorder caused by neutron, electron or ion irradiation.

Among the techniques employed in recent years for doping semiconductor materials, the technique of ion implantation has received marked attention. Following is a brief discussion of the ion implantation technique which may be helpful:

In an ion implantation process, impurity atoms are first ionized, and then by means of divers electric and/or magnetic fields these ions may be formed into beams of various diameters and shapes and may also be caused to travel in predetedmined directions at predetermined velocities. Hence in direct contrast to a conventional diffusion process—where available atoms are usually in vapor state, and may make contact with an exposed surface of a semiconductor body only in accordance with thermodynamic conditions present-conductivity-determining impurity ions may be made to enter a semiconductor crystalline lattice structure in a predetermined direction at a predetermined velocity, and may be placed precisely therein in a prescribed concentration and controlled to a desired degree of uniformity or gradation.

The many unique features and potential advantages of ion implantation, however, can be outweighed on occasion by the accompanying undesirable effects of radiation damage arising from the heavily disordered regions around the track of each dopant particle. Further, because of the nonequilibrium nature of the implantation process, the relative number of impurities on substitutional and interstitial sites may differ from that observed following the more conventional diffusion process.

As is well known in the semiconductor art implantation with a 20 kev. beam of antimony ions, for example, into a silicon substrate at room temperature causes heavy damage to the silicon crystal lattice, with antimony occupying random positions in the damaged lattice structure. Each antimony ion entering the silicon crystal surface loses energy in collisions with the crystal lattice and creates a damage track region called a cluster, about 100 angstroms in diameter to a depth which depends upon the radiation energy. A dose of approximately $10^{14}$ ions/cm.$^2$ will totally damage the irradiated surface.

At radiation doses greater than $10^{14}$ ions/cm.$^2$, the damage track regions, or clusters, overlap to produce an essentially amorphous surface layer, the thickness of which is roughly equivalent to the range of the implanted ion. For such saturation doses, with the resultant amorphous surface layer, a minimum annealing temperature of about 650° C. is needed to restore order in the lattice structure and to achieve a high level of substitutional antimony therein. It has been established that of all dopants investigated, as gallium, arsenic, indium, antimony and xenon, for example, only antimony and arsenic are capable of achieving a substitutional level of more than 80% after implantation annealing.

It is also well known in nuclear radiation damage art that high temperatures are needed to anneal out complex damage clusters induced at room temperature in silicon, and that as the extent of damage is increased, higher temperatures are required. In all cases, these high temperatures are not compatible with treatment of other components in device fabrication, as, for example, those components having metal constituents with low melting points.

Hence, it is desirable to find a means to use lower annealing temperatures. The method of the invention provides such a means. For example, instead of annealing an antimony-implanted silicon substrate at temperatures as high as 800–900° C. as heretofore required, it is desirable to use a lower temperature and yet to increase the number of carriers to a level near that before annealing, simultaneously restoring order to the crystal lattice and insuring a high substitutional level. A means to satisfy both requirements is found to be a subsequent, or second implantation during the annealing process with an electrically inactive ion, as carbon, or neon or silicon, for example, into the antimony-implanted silicon crystals. The method of the present invention, comprising an irradiation with carbon, for example, simultaneous with the annealing process, has been found to increase the number of carriers to a level near that before the high-temperature annealing and to reduce the annealing temperature to about 500° C.

It is therefore an object of the present invention to provide an improved method for treating crystals so as to improve or otherwise advantageously alter their electrical and physical properties.

It is a further object of the invention to provide a method for restoring crystals damaged by particle irradiation, as neutron, electron or ion irradiation.

Another object of the invention is to provide a method for restoring structure in the lattice of crystals damaged by particle irradiation.

Still another object of the invention is to provide a method for restoring crystal structure by annealing ion-implanted damaged crystals in the presence of a second ion-irradiation.

These and other objects and advantages of the present invention are accomplished by first implanting a semiconductor substrate at room temperature with impurity ions and then annealing the crystals of the substrate at a predetermined higher temperature while simultaneously ion-irradiating the substrate with electrically inactive ions so that a lower annealing temperature than otherwise possible may be employed.

The practice of the invention will be described in greater detail in connection with the following example of the method of the invention. A silicon crystal is implanted with antimony ions from a 20 kev. beam at room temperature. Following this implantation the crystal appears milky in color compared to the normal bluish color of single-crystal silicon, thus indicating damage. The crystal is then annealed at 500° C. for ten minutes while being simultaneously irradiated with carbon ions from a 20 kev. beam thereof. Upon returning to room temperature, the annealed and carbon-irradiated crystal no longer appears milky, the absence of which indicates a substantial reduction in damage. Thus, the carbon irradiation enhances the annealing-out of implantation damage, tending to recreate the initial condition of crystal structure before implantation. Previously temperatures of about 650° C. were required to achieve the same level of annealing in non-carbon-irradiated crystals. Further, following the carbon irradiation at 500° C., the irradiated sample has been found to contain about ten times as many substitutional antimony donors as observed in non-carbon-irradiated samples.

The carbon ion appears to provide energy to dissociate complex damage clusters while epitaxially repairing the damaged region from an inner portion of the crystal outward toward the surface.

The advantage in utilizing ions of an element such as carbon, for example, lighter than that of the implantation element is that the lighter ion range is greater for the same energy of irradiation. Hence during annealing the lighter element ions reach the depth of the damaged region to provide energy to repair the structure at the boundary between damaged and undamaged material, and hence allows epitaxy to proceed. However, heavier element ions may be similarly utilized when energies are appropriately increased to attain the range required.

It has also been observed that the utilization of carbon ions or the like as described above may be used to control the resistivity in a semiconductor body so as to permit the establishment of a high resistivity region in a low-resistivity substrate, for example.

Alternatively the method of the present invention can be applied to enhance crystal growth under conditions having evaporated or chemically deposited films, where epitaxy to the substrate crystal is desired. Irradiation with carbon, for example, can be applied during or after the film deposition. Additionally, the method will allow the utilization of lower temperatures in crystal growth processes.

It is to be understood herewith that any semiconductor materials, or insulator or semi-insulator material, having a crystal structure, is intended to be within the scope of this present application and the appended claims. Silicon and germanium are representative and not exclusive examples thereof.

The above description, and examples described herein, are intended for illustration only. Any modification of or variation thereupon which conforms to the spirit of the invention is intended to be included within the scope of the appended claims.

What is claimed is:

1. A method for restoring the lattice structure of a silicon crystal substrate which has been damaged by ion-bombardment comprising:
annealing said substrate at around 500° C.; and
simultaneously irradiating said substrate with a beam of ions selected from the group consisting of carbon, neon and silicon.

2. The method claimed in claim 1 wherein said irradiating ions are of carbon.

3. The method claimed in claim 1 wherein the energy of said beam is sufficient to cause said irradiating ions to reach the depth of the damaged region.

4. The method claimed in claim 1 wherein said annealing and said simultaneous irradiation is performed for essentially ten minutes.

5. A method for restoring the lattice structure of a silicon crystal substrate which has been damaged by bombardment with antimony ions of a predetermined energy comprising:
annealing said substrate for essentially ten minutes at around 500° C.; and
simultaneously irradiating said substrate with carbon ions of essentially said predetermined energy.

6. The method claimed in claim 5 wherein said predetermined energy is essentially 20 kev.

References Cited

UNITED STATES PATENTS

| | | | |
|---|---|---|---|
| 2,787,564 | 4/1957 | Shockley | 148—1.5 |
| 3,272,661 | 9/1966 | Tomono et al. | 148—1.5 |
| 3,326,176 | 6/1967 | Sibley. | |
| 3,457,632 | 7/1969 | Dolan et al. | 148—1.5 |

L. DEWAYNE RUTLEDGE, Primary Examiner

R. A. LESTER, Assistant Examiner

U.S. Cl. X.R.

29—578; 148—186